United States Patent
Katz et al.

(10) Patent No.: US 10,009,404 B2
(45) Date of Patent: Jun. 26, 2018

(54) ENTERPRISE CLASS VIRTUAL DESKTOP INFRASTRUCTURE

(71) Applicant: Avaya Inc., Basking Ridge, NJ (US)

(72) Inventors: Bryan Katz, Freehold, NJ (US); Ted Youel, Edina, MN (US); Daryl Huff, Saratoga, CA (US); Michael Keenan, Stittsville (CA)

(73) Assignee: Avaya Inc., Basking Ridge, NJ (US)

( * ) Notice: Subject to any disclaimer, the term of this patent is extended or adjusted under 35 U.S.C. 154(b) by 620 days.

(21) Appl. No.: 13/764,976

(22) Filed: Feb. 12, 2013

(65) Prior Publication Data

US 2013/0326081 A1    Dec. 5, 2013

Related U.S. Application Data

(63) Continuation-in-part of application No. 13/630,038, filed on Sep. 28, 2012.

(60) Provisional application No. 61/652,702, filed on May 29, 2012, provisional application No. 61/682,064, filed on Aug. 10, 2012.

(51) Int. Cl.
*G06F 15/16* (2006.01)
*H04L 29/06* (2006.01)

(52) U.S. Cl.
CPC ........ *H04L 65/608* (2013.01); *H04L 63/0272* (2013.01); *H04L 63/0815* (2013.01)

(58) Field of Classification Search
CPC ............... H04L 65/608; H04L 63/0815; H04L 63/0272
See application file for complete search history.

(56) References Cited

U.S. PATENT DOCUMENTS

| | | | | |
|---|---|---|---|---|
| 7,643,412 | B1* | 1/2010 | Mitchell et al. | 370/230 |
| 8,611,428 | B1* | 12/2013 | Huang et al. | 375/240.26 |
| 2002/0049037 | A1* | 4/2002 | Christensen | G06Q 30/0267 455/3.06 |
| 2003/0101263 | A1* | 5/2003 | Bouillet | G06Q 50/06 709/225 |
| 2009/0268655 | A1 | 10/2009 | Bertz et al. | |
| 2010/0325415 | A1* | 12/2010 | Ohlman | H04L 12/1881 713/150 |
| 2011/0197132 | A1* | 8/2011 | Escoda | H04L 67/38 715/733 |
| 2011/0225578 | A1 | 9/2011 | Lauwers et al. | |
| 2012/0218374 | A1 | 8/2012 | Matula et al. | |

(Continued)

OTHER PUBLICATIONS

U.S. Appl. No. 13/630,038, filed Sep. 28, 2012, Katz et al.

(Continued)

*Primary Examiner* — Michael A Keller
(74) *Attorney, Agent, or Firm* — Sheridan Ross P.C.

(57) ABSTRACT

Methods and systems for providing an enterprise class virtual desktop infrastructure (VDI) are provided. Aspects of the VDI include providing support for multiple simultaneous virtual private networks (VPNs), video calls, and for operatively connecting to a selected connected device within a personal workspace through a single sign on procedure. A teletype (TTY) function can also be provided using normal or VPN connections. The VDI can comprise or be incorporated into a thin client device, a telephone, a headset, a keyboard, a mouse, or a monitor.

19 Claims, 5 Drawing Sheets

(56) References Cited

U.S. PATENT DOCUMENTS

2013/0018953 A1* 1/2013 McConnell et al. .......... 709/204

OTHER PUBLICATIONS

"Frequently Asked Questions for Cisco VXC 4000 Release 1.0," Cisco, revised Jan. 19, 2012, 14 pages, found at: (www.cisco.com/en/US/docs/voice_ip_comm/vxc/english/vxc_4000_1.0/FAQ/b_VXC4000_faq.html).
Managing media contention, Wyse Rich Sound Solution, 20 pages, http://www.wyse.com/products/software/tcx/index.asp.
Thorslund "Tech Preview of Wyse TCX Flash Redirection," The Citrix Blog, Jun. 2, 2009, 1 page, found at: (//blogs.citrix.com/2009/06/02/tech-preview-of-wyse-tcx-flash-redirection/).
Lopez-Martin "Citrix Virtual Channel SDK extends HDX capabilities," The Citrix Blog, Apr. 30, 2010, 1 page, found at: (//blogs.citrix.com/2010/04/30/citrix-virtual-channel-sdk-extends-hdx-capabilities/).
Offical Action for U.S. Appl. No. 13/630,038, dated Apr. 30, 2015, 22 pages.
Offical Action for U.S. Appl. No. 13/630,038, dated Jun. 10, 2015, 25 pages.
Official Action for U.S. Appl. No. 13/630,038, dated Aug. 17, 2015 24 pages.

* cited by examiner

ENTERPRISE CLASS VIRTUAL DESKTOP INFRASTRUCTURE

CROSS-REFERENCE TO RELATED APPLICATIONS

This application is a continuation-in-part of U.S. patent application Ser. No. 13/630,038, filed Sep. 28, 2012, which claims the benefit of U.S. Provisional Patent Application Ser. No. 61/652,702, filed May 29, 2012, and U.S. Provisional Patent Application Ser. No. 61/682,064, filed Aug. 10, 2012, the entire disclosures of which are hereby incorporated herein by reference.

FIELD

Embodiments of the present disclosure generally relate to a virtual desktop infrastructure. More particularly, embodiments of the present disclosure relate to addressing stream management issues in a client device that provides real time communications.

BACKGROUND

When a virtual machine is deployed in a data center, a thin client uses a remote desktop protocol to access the virtual machine. A soft phone computer program can be deployed on such a virtual machine, and the thin client can be configured to provide a user control interface, as well as terminate incoming voice and video streams, and generate outgoing voice and video streams. Local virtual device drivers in the thin client device are used to render incoming audio and video, and to capture the outgoing audio and video. The remote desktop protocol provides the control of voice and video data between the virtual machine and the thin client system that sits with the employee using the desktop. Improvements in this protocol can optimize the transmission of real time voice and video as perceived by the user between the virtual machine and the thin client. In addition, improvements have been developed that create a session initiation protocol (SIP) back to back capability in a virtual desktop infrastructure system. However, where a thin client handles both SIP protocol communications and other media streams that are routed through the virtual machine, there is the possibility of media contention issues at the thin client.

SUMMARY

Systems and methods for virtualized devices are provided. More particularly, a thin client device that is operated in cooperation with a virtualized environment implemented by a virtual desktop infrastructure (VDI) virtual machine server device (or VDI server) is provided. The thin client or VDI client device is in communication with the VDI server computer over a communication network. Various operations executed on behalf of a user of the thin client device are executed by the VDI server computer in a virtual personal computer environment. The thin client device also operates to support real time communications between the thin client device and communication endpoints other than the server. In accordance with further embodiments of the present disclosure, the thin client device can support multiple virtual private network (VPN) connections. In accordance with still other embodiments, the thin client device can support teletype (TTY) communications.

The thin client executes a virtual desktop infrastructure receiver application that operates in association with the virtualized operations performed on the VDI server. These virtualized operations performed by the server on behalf of the thin client can include operations that involve the exchange of control data as part of a controlled data stream between the thin client and the VDI server. In addition, the thin client can receive real-time protocol (RTP) media streams from endpoints that are separate from the VDI server providing the virtualized environment at a VDI communicator (VDI-C) application. The media stream comprising RTP media and the control data stream associated with virtualized operations can be transmitted using different VPN connections. In order to support the VPN connections, the thin client is provided with the VPN client software. The VPN client software can be under the control of a VDI desktop media controller (DMC).

Methods in accordance with embodiments of the present disclosure include providing a media stream and a control data stream to a thin client device. The media stream and the control data stream are each associated with a different VPN. Alternatively, session border controllers (SBC) can be used in place of client side VPN software. The thin client device includes a VPN client that receives the media and control data streams. Methods of embodiments of the present disclosure also provides support for multiple simultaneous VPN connections between a thin client device and other devices and/or servers using one or more physical networks.

Additional features and advantages of embodiments of the present invention will become more readily apparent from the following description, particularly when taken together with the accompanying drawings.

DETAILED DESCRIPTION

Figure 1:
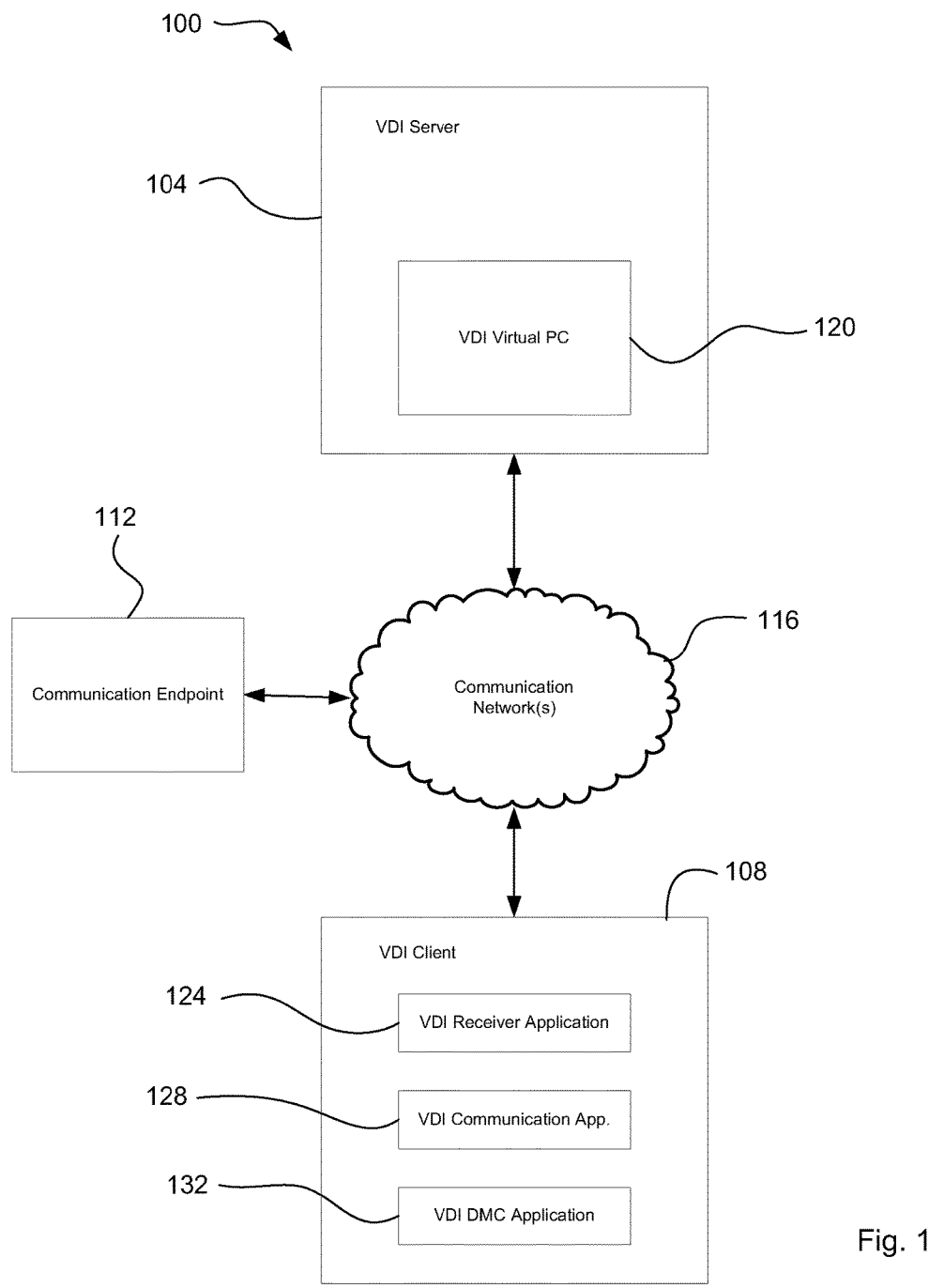
FIG. 1 is a block diagram of a system in accordance with embodiments of the present disclosure.

FIG. 1 depicts a system 100 implementing a virtualized desktop infrastructure (VDI) in accordance with embodiments of the present disclosure. The system 100 generally includes a VDI server 104, a first endpoint or device, comprising a thin or VDI client device 108, and a second endpoint, comprising a communication endpoint 112. The various devices 104, 108 and 112 are in communication with one another via one or more networks 116. In accordance with at least some embodiments of the present disclosure, the system 100 incorporates systems and methods described in co-pending application Ser. No. 13/351,301, filed Jan. 17, 2012, entitled "SYSTEM AND METHOD FOR ASSESSING QUALITY REAL-TIME COMMUNICATIONS EXPERIENCE IN A VIRTUAL MACHINE", assigned to Avaya Inc., the entire disclosure of which is hereby incorporated herein by reference.

In accordance with embodiments of the present disclosure, the VDI server 104 provides a VDI virtual PC 120, which can be implemented as an application executed by the VDI server 104. The VDI virtual PC 120 operates a hosted personal computer, which can be accessed by a VDI client device 108. Moreover, the VDI virtual PC 120 can comprise or be associated with PC software applications, including applications hosted in a data center. As described in greater detail elsewhere herein, the VDI server 104 may operate in connection with providing processing and/or memory for executing applications or other programs on behalf of interconnected thin client devices 108. As examples, the VDI server 104 may comprise a Citrix™ XenDesktop™ system or a VMWare View™ system.

The VDI client device 108 generally comprises a small computer that is optimized to host VDI receiver software 124. The VDI client device 108 can include ports for various user inputs and user outputs, including but not limited to a keyboard, monitor, and headset. The VDI client device 108 also includes ports for interconnecting the VDI client device 108 to other devices, including but not limited to the VDI server 104 and the communication endpoint 112, via the one or more networks 116. The VDI receiver 124 is executed by the VDI client device 108, and communicates with the server 104. The VDI client device 108 can also execute a VDI communication application 128. In general, the VDI communication application 128 can provide a local telephone, soft phone, video phone, or other communication facilities, for use in connection with media streams, including but not limited to real time protocol (RTP) media streams. In accordance with embodiments of the present disclosure, the VDI client device 108 also includes a VDI desktop media controller (DMC) application 132. The VDI DMC application 132 may comprise a communications soft client that controls media streams received at the VDI client device 108. More particularly, and as described in greater detail elsewhere herein, the VDI DMC application 132 can manage media contention issues at the VDI client device 108. As an example, the VDI receiver 124 may comprise a Citrix™ receiver application. Moreover, communications between the VDI client device 108 and the VDI server 104 may be implemented in connection with a proprietary protocol, such as but not limited to the Citrix™ HDX protocol. In accordance with further embodiments, communications handled by the VDI communication application 128 may be implemented in connection with the session initiation protocol (SIP).

The communication endpoint 112 can comprise any device or virtual endpoint capable of exchanging communications with the VDI client device 108 through one or more of the networks 116. As an example, but without limitation, the communication endpoint 112 may comprise a telephone, soft phone, smart phone, desktop computer, laptop computer, tablet computer, or the like. In accordance with still other embodiments, the communication device 112 may itself comprise a VDI client device 108. A communication session established between the communication endpoint 112 and the VDI client device 108 may comprise an audio and/or video media stream, text stream, or other data stream. Moreover, a communication channel may be implemented as an RTP media stream. As yet another example, the communication channel may be implemented using the SIP protocol, or other signaling protocol, such as but not limited to H.323.

Figure 2A:
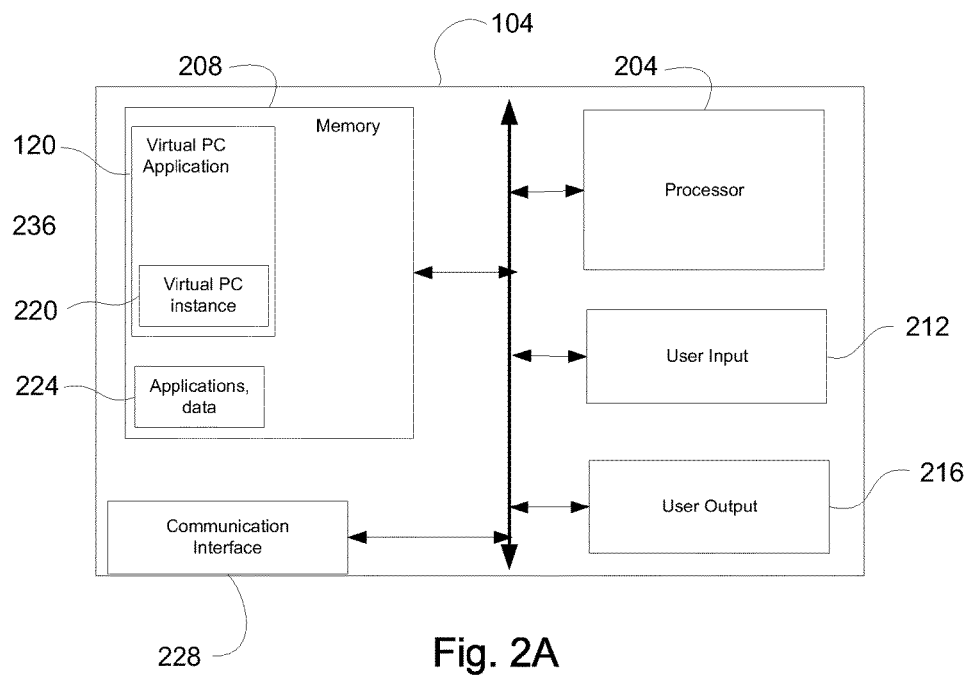
FIG. 2A depicts components of a VDI server in accordance with embodiments of the present disclosure.
Figure 2B:
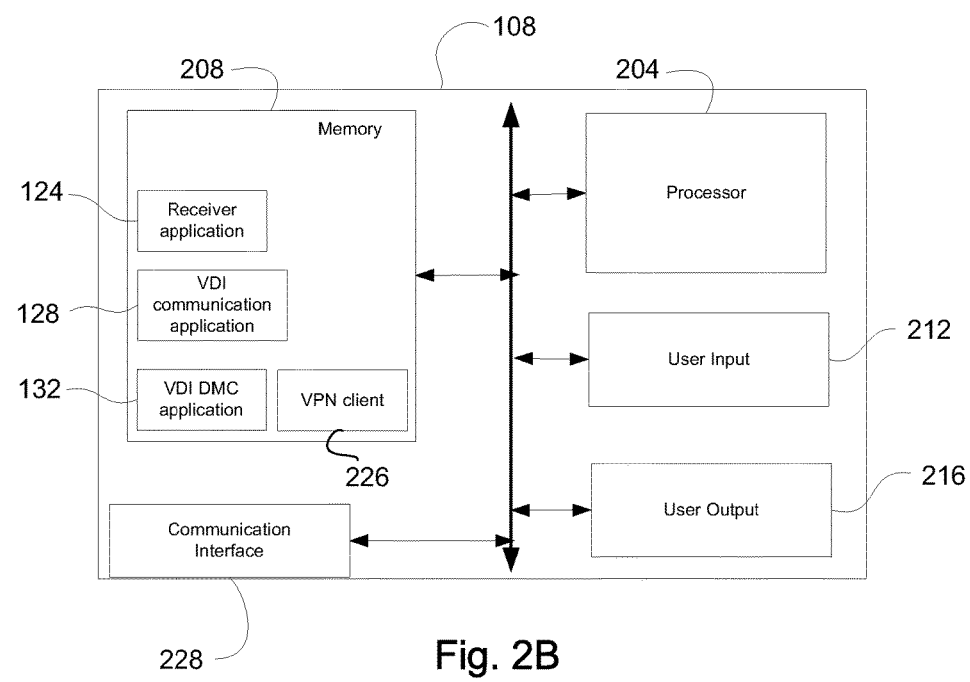
FIG. 2B illustrates components of a VDI client device in accordance with embodiments of the present disclosure.

FIGS. 2A and 2B are block diagrams depicting components of a system 100 in accordance with embodiments of the present invention. More particularly, components of a VDI server 104 are shown in FIG. 2A, while components of a VDI client device 108 are shown in FIG. 2B. As the VDI server 104 and the VDI client device 108 can, at least partially, be implemented as conventional computing devices, they share certain components in common. For example, each generally includes a processor 204 capable of executing program instructions. The processor 204 may include any general purpose programmable processor or controller, such as but not limited to a processor implementing hardware, for executing application programming. Alternatively, the processor 204 may comprise a specially configured application specific integrated circuit (ASIC). The processor 204 generally functions to run programming code implementing various functions performed by the associated VDI server 104 or the VDI client device 108. For example, with respect to the VDI server, the processor 204 can implement functions including hosting a VDI virtual PC environment through execution of a VDI virtual PC application or system 120. As another example, with respect to the VDI client device 108, such functions can include implementing a receiver application function 124 for communicating with the VDI server 104, that allows a user of the VDI client device 108 to login to the VDI server 104, and to start up and interact with the VDI virtual PC 120. Functions of the VDI client device 108 can also include support for communications between the VDI client device 108 and a communication endpoint 112, for example through execution of the VDI communication application 128 that provides telephony, video telephony, or other communications functions. As yet another example, the functions include the provision of media controls through a VDI DMC application 132 that allow a user of the VDI client device 108 to address media contention issues, including but not limited to contention between media streams presented through interaction of the VDI client device 108 with VDI server 104, and communications between a communication endpoint 112 and the VDI client device 108. The client device 108, through the VDI DMC application 132 or some other application, can also provide a single sign-on function that allows a user to login once on the VDI client device 108 and also be logged in on the receiver application 124, and the VDI communication application 128. Accordingly, a user can effectively login to multiple services by providing authorization information in a single sign-on procedure. The VDI client device 108 can also include one or more VPN clients 226. The VPN client 226 can operate to support or establish encrypted tunnels for secure communications with other endpoints, such as other communication devices 112 and servers 104.

The VDI server 104 and the VDI client device 108 can additionally include memory 208. The memory 208 can be used in connection with the execution of programming by the processor of the associated device 104 or 108, and for the temporary or long term storage of data or program instructions. For example, the memory of the VDI server 104 can include the VDI virtual PC application 120 and hosted virtual PC instances 220 established in connection with VDI client devices 108. As can be appreciated by one of skill in the art after consideration of the present disclosure, the memory 208 of the VDI server 104 can also include various operating system software, applications, and data 224 that can be used in connection with the provision of a hosted personal computer on behalf of one or more connected VDI client devices 108. The memory 208 included in the VDI client device 108 can include the receiver application 124, the VDI communication application 128, and the VDI DMC application 132.

In addition, user input devices 212 and user output devices 216 may be provided. With respect to the VDI server 104, the one or more user input devices 212 or one or more user output devices 216 can facilitate the administration and control of the VDI server 104. With respect to the VDI client device 108, the user input devices 212 and user output devices 216 can support interaction between a user of the VDI client device 108 and the hosted virtual PC. Moreover, user input devices 212 and user output devices 216 associated with the VDI client device 108 can enable a user to interact with a media stream between the VDI server 104 and the VDI client device 108, and/or between a communication endpoint 112 and the VDI client device 108. Examples of user input devices 212 include a microphone, keyboard, numeric keypad, touch screen, pointing device combined with a screen with other position encoder, and a biometric sensor. Examples of user output devices 216 include a speaker, headset, display, touch screen display, and alphanumeric display. As can be appreciated by one of skill in the art, a touch screen display may comprise a combined user input 212 and user output 216 device. The VDI server 104 and the VDI client device 108 may also generally include one or more communication interfaces 228, to interconnect the associated device to one or more of the networks 116.

Figure 3:
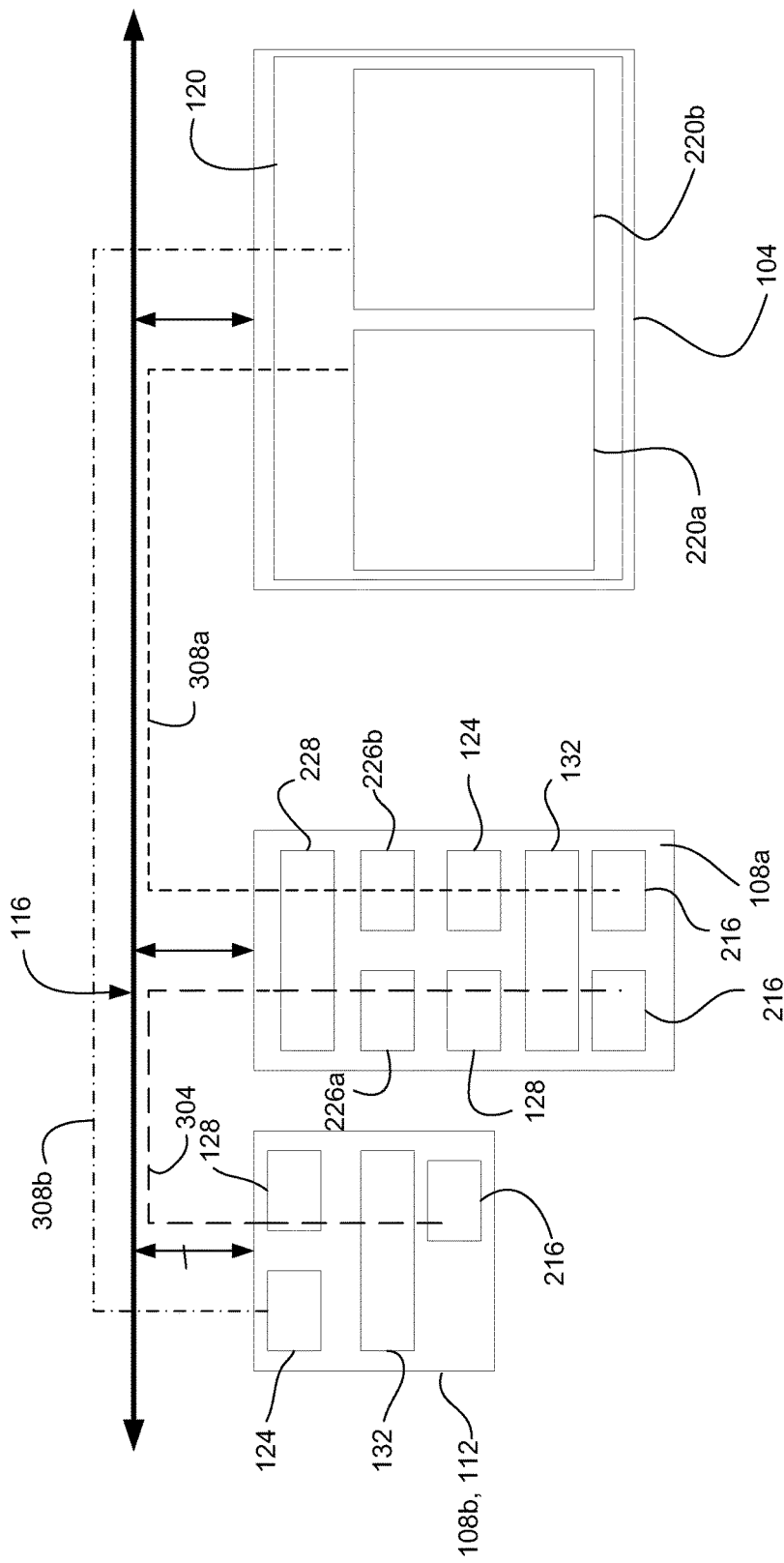
FIG. 3 depicts data flows in a system in accordance with embodiments of the present disclosure.

FIG. 3 depicts data flows in a system 100 in accordance with embodiments of the present disclosure. More particularly, FIG. 3 depicts a first VDI client device 108a in communication with a communication endpoint 112. In this example, the communication endpoint 112 comprises a second VDI client device 108b. The first VDI client device 108a is in communication with the second VDI client device 108b (i.e., the communication endpoint 112) via a direct communication channel 304. As an example, but without limitation, the direct communication channel 304 between the VDI client devices 108 may comprise an RTP media stream, such as a voice telephony communication session implemented using the SIP protocol. Moreover, the communication channel 304 is direct in that it does not pass through the VDI server 104. In accordance with embodiments of the present disclosure, the communication channel 304 may comprise a media stream that is associated with a first VPN. Where the media stream is associated with a first of VPN connection, the communication channel 304 comprising that media stream is connected to the VDI communication application 128 via a VPN client instance 226a.

In addition to the direct communication session 304, the first VDI client device 108a is in active communication with the VDI server 104 over a first remote control channel or datastream 308a. The remote control channel 308a may comprise data passed between the first VDI client device 108a and the VDI server 104 that is generated and/or exchanged in connection with the provision of a hosted virtual PC service provided to the first VDI client device 108a by the VDI server 104. As an example, but without limitation, the remote control channel 308a may be formatted according to a proprietary protocol, such as the Citrix™ HDX protocol. In addition, the second VDI client device 108b may be in communication with the VDI server 104 via a second remote control channel or datstream 308b. At the VDI client device 108, the respective remote control channels 304, 308 are passed to a receiver application 124 running on the VDI client devices 108. Where the remote control channel 308 utilizes the HDX protocol, the receiver application 124 may comprise a Citrix™ receiver application. At the VDI server 104, the remote control channels 308 are handled by the VDI virtual PC application 120, and in particular at separate logical partitions or virtual PC processes 220a and 220b, for the different VDI client devices 108. In accordance with embodiments of the present disclosure, one or both of the remote control channels 308 may be associated with a VPN connection. For example, a control datastream associated with the first client device 108a may be carried by a remote control channel 308a that is connected to the first client device 108a and via a second VPN client instance 226b.

In addition to the receiver application 124, the VDI client device 108 generally includes a VDI communication application 128. As an example, but without limitation, the VDI communication application 128 can include a soft phone function, to support communications with other VDI client devices 108 and/or other communication devices 112. Accordingly, the VDI communication application 128 can function as an endpoint for a telephony session implemented using the SIP or other signaling protocol, and/or the RTP or other media protocol. More particularly, the VDI communication application 128 can support direct RTP communications between a VDI client device 108 and a communication endpoint 112. Accordingly, the RTP communication channel 304 between the VDI client devices 108 is received at the respective VDI communication applications 128 of the VDI client devices 108.

As depicted in FIG. 3, a VDI client device 108 can be involved in multiple simultaneous communication sessions, including a communication session with another VDI client device 108, a communication endpoint 112, and/or a VDI server 104. Moreover, it can be appreciated that, where the communication streams 304, 308 involve common communication nodes, contention issues can arise at a receiving VDI client device 108. In particular, where multiple communication or media streams 304 and 308 arrive at a single VDI client device 108 simultaneously, the different facilities (e.g. receiver application 124 and the VDI communication application 128) on the VDI client device 108 can both seek to make use of the user output 216 facilities of the VDI client device 108 at the same time. In order to provide user control over the output of the media streams 304, 308, the media streams can be provided to the VDI DMC application 132. The VDI DMC application 132, in response to input from the user and/or through the application of programmed rules, can then control the provision of the media streams 304, 308 to the user output 216. As can be appreciated by one of skill in the art after consideration of the present disclosure, the VDI DMC 132 can operate to pass a selected media stream 304 or 308 to the user output 216. Alternatively or in addition, different media streams 304, 308 can be provided by the VDI DMC 132 to different user outputs 216. For example, a voice telephony media stream 304 from a communication endpoint 112 (e.g., a telephone call) can be provided to a user output comprising a handset or headset, while a media stream 308 from an Internet source (e.g., an Internet streamed media connection, such as YouTube) delivered through operation of a virtual PC process 220 running on the VDI server 104 can be provided to a user output 216 comprising speakers interconnected to the VDI client device 108. Moreover, in addition to acting as a switch, the VDI DMC 132 can implement other actions or controls, including but not limited to controlling the volume at which an audio portion of a media stream 304, 308 is output, controlling the portion of a display or windowing or a visual output associated with a media stream 304, 308, or the like.

Figure 4:
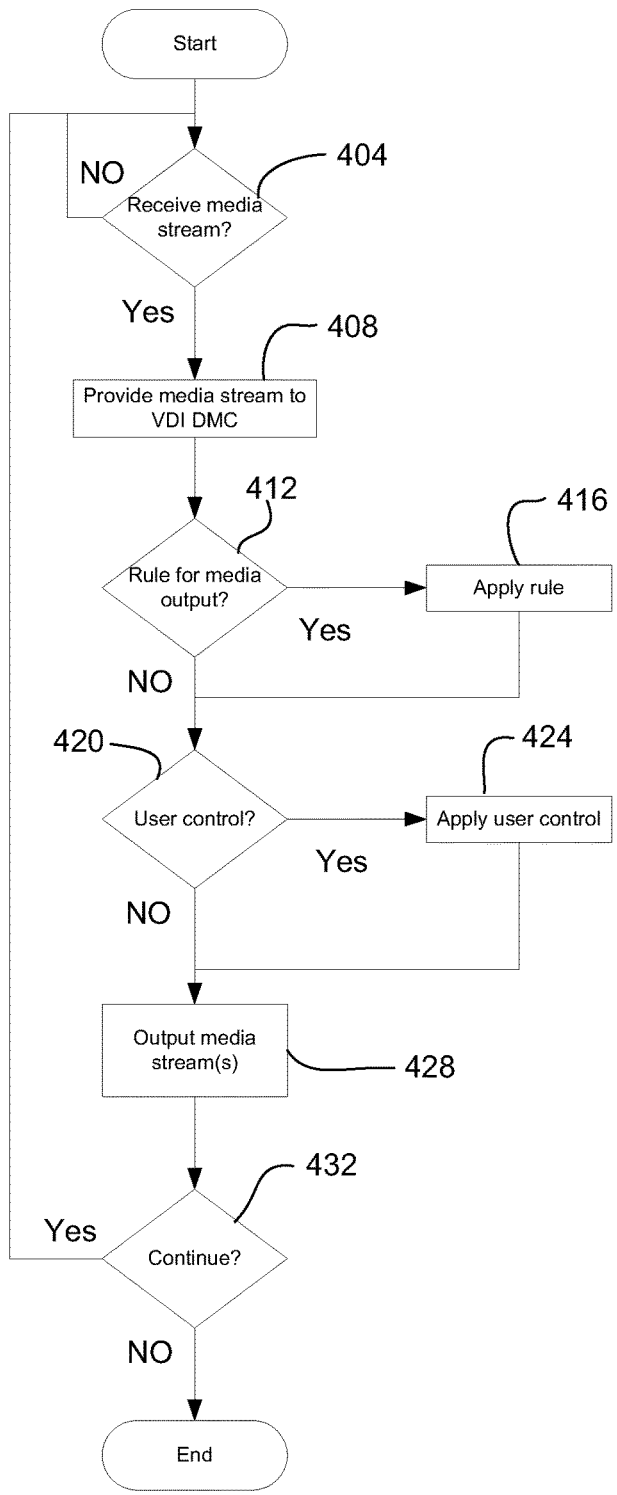
FIG. 4 is a flowchart illustrating aspects of the operation of a system in accordance with embodiments of the present disclosure.

FIG. 4 illustrates aspects of a method for performing media contention at a VDI client device 108 in accordance with embodiments of the present disclosure. Initially, at step 404, a determination is made as to whether a media stream 304 or 308 is received at the VDI client device 108. Until a media stream 304 or 308 is received, the process can idle at step 404. Upon receiving a media stream 304 or 308, that media stream 304 or 308 is provided to the VDI DMC application 132. In accordance with embodiments of the present disclosure, the media stream 304 or 308 can be provided to the VDI DMC application 132 by the receiver application 124 (in the case of a media stream provided through a service hosted by the VDI server 104), or the VDI communication application 128 (in the case of a media stream 304 provided from a communication endpoint 112). At step 412, the VDI DMC application 132 determines whether a rule exists for media output that can be applied to the subject media stream 304 or 308. If a rule exists, it can be applied (step 416). In general, rules can be configured or administered for application by default or in a particular context. As an example, but without limitation, a rule can be administered such that the VDI DMC application 132 delivers an RTP media stream 304 from a communication endpoint 112 to a user output 216 comprising a headset for voice telephony sessions. As another example of a rule administered by the VDI DMC application 132, an audio/video stream received as part of a remote control channel 308 from the VDI server 104 can have a video component displayed in a window of a user output 216 comprising a video monitor, while the audio portion can be provided to a user output 216 comprising speakers.

At step 420, a determination can be made by the VDI DMC application 132 as to whether user control input has been received. In particular, embodiments of the present disclosure can provide a user interface through which a user of the VDI client device 108 can enter control input. The user interface can comprise a graphical user interface and/or a hardware input. If a user control input is received, the application of such input can be subject to rules implemented by the VDI DMC application 132. For example, certain administered rules may be modified by the user through control input, while other rules may not. If user control input is received, and if such input is allowed to modify any default rules that may be affected, that user control input is applied (step 424).

At step 428, the media stream or streams 304, 308 are output, according to the applied rules and/or user control input. In addition to controlling the identity of a device at which a particular media stream 304, 308 is output, other aspects of the output can be controlled. For example, the window in which a video output is displayed, the size of the window, the particular device through which audio output is delivered, the volume of such output, tone controls, and the like can all be controlled by the VDI DMC application 132. Accordingly, the VDI DMC application 132, executed by the VDI client device 108, provides local control for multiple communication streams 304, 308. In addition, through providing local control, the VDI DMC application 132 allows media contention to be performed at the VDI client device 108.

At step 432, a determination can be made as to whether operation of the method is to continue. If operation is to continue, the process can return to step 404. Otherwise, the process can end.

While the user experience for VDI is driving a single point-of-view, the enterprise infrastructure will typically be divided with the VDI Server 104 likely housed in a different facility than a communications center server. Embodiments of the present disclosure allow for media streams 304, 308 from different sources to be controlled at the VDI client device 108. In particular, embodiments of the present disclosure allow media streams 304, which can be provided by a communication endpoint 112 or a communications server that is separate from the VDI server 104, and media streams 308 comprising VDI content that is delivered through an enterprise Network, to be controlled from within the desktop communications device or VDI client device 108. Further, this media content can be offered via a virtual private network (VPN). In addition, a control datastream that carries control data between the VDI client device 108 and the VDI server 104 can be implemented through a virtual private network. Each VPN connection can be supported by a VPN client or client instance 226 at the VDI device 108. In accordance with still further embodiments, the VDI DMC 132 can incorporate a local VPN manager that will coordinate the VPN streams.

In an exemplary configuration incorporating multiple VPN connections, the VDI client device 108 is located outside of an enterprise and is endeavoring to connect remotely. The ability to connect a VDI receiver 124 to the VDI server 104 via VPN is a well-understood problem. Similarly, the ability to connect a remote client to the communications center via VPN is well understood. In this scenario, the control path for the VDI communication application 128 is sent via the VDI receiver 124 over one VPN (e.g. 308 in FIG. 3) while the audio path is delivered to a completely different physical location via a different VPN connection (e.g. 304 in FIG. 3), for example using a different technology (e.g., IPSEC). For many large enterprises, the voice communications hub is typically housed in a separate data center than the IT hub.

It is not viable to route the media content and the data content over a single VPN. For example, doing so would result in contention issues. Therefore, the VDI client device can run two VPN clients 226 in parallel—one to carry the VDI or remote control or data content 308 and one to carry the media content 304. The two applications running on the VDI Device 108, the VDI receiver 124 and the VDI communication application 128, normally run transparently with regard to VPN. The applications layer is separate from the transport layer by design. In this situation, however, with parallel VPNs the applications layers will need to coordinate delivery to the appropriate subnetwork. In accordance with embodiments of the present disclosure, the VDI DMC application 132 can route data from the receiver application 124 and data from the VDI communication application 128 to the appropriate VPN client or client instance 226. Moreover, such routing can be accomplished through a single network connection, or through multiple network connections.

Figure 5:
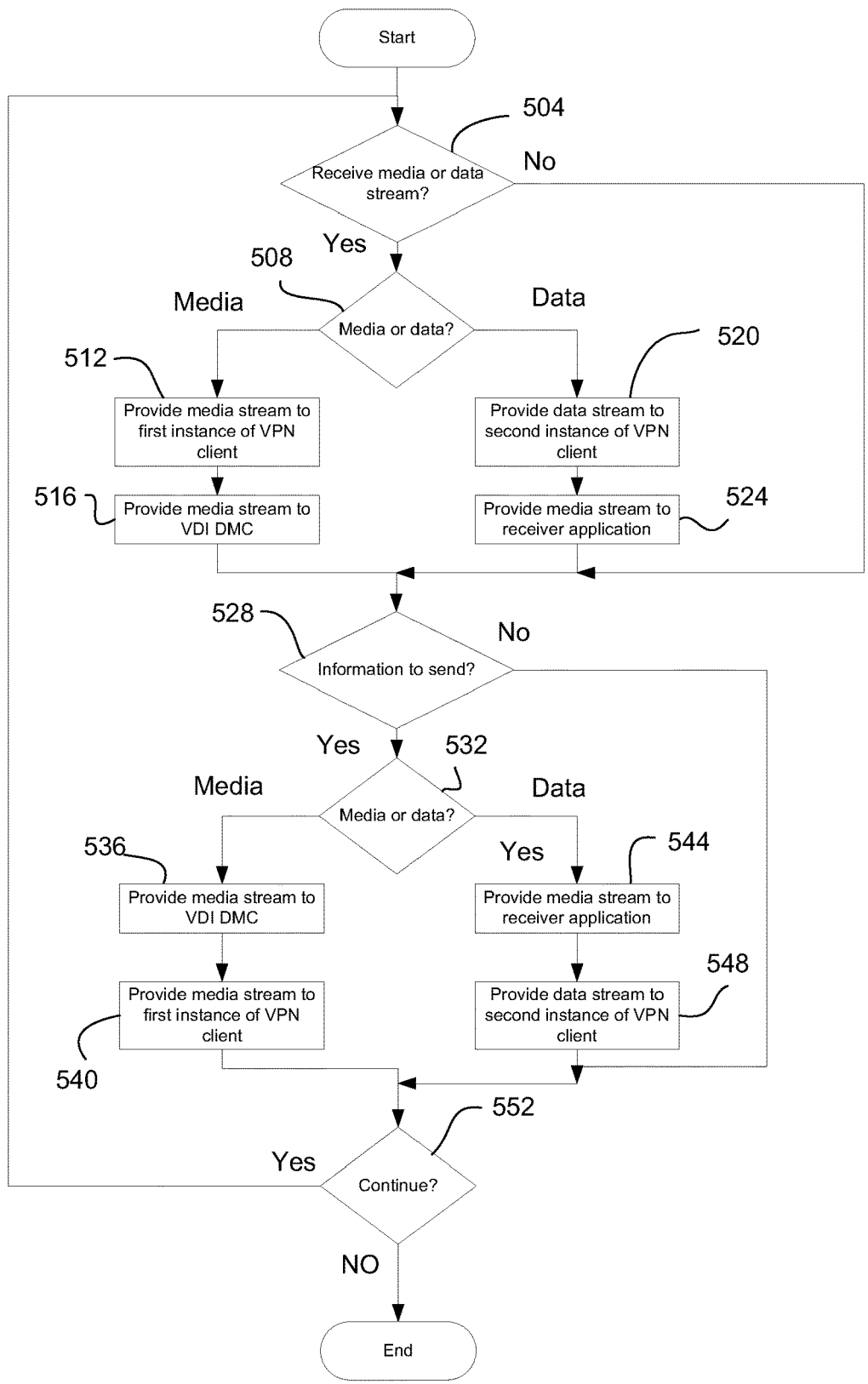
FIG. 5 is a flow chart illustrating aspects of the operation of a system in accordance with other embodiments of the present disclosure.

FIG. 5 illustrates aspects of a method for supporting multiple VPN connections at a VDI client device 108. Initially, a determination is made as to whether a media 304 or datastream 308 is received at the communication interface 228 of the VDI device 108 as part of a VPN connection (step 504). If a media 304 or datastream 308 is received at the communication interface 228, a determination can next be made as to the content of the VPN connection, that is, whether the connection carries media or remote control data (step 508). This determination can be made by logic included in the communication interface 228, and/or by the VDI DMC application 132.

If the VPN connection is determined to be carrying media content, the media 304 stream is provided to a first VPN client instance 226a (step 512). The media 304 stream is then provided to the VDI DMC application 128 (step 516). Accordingly, data, in this case in the form of media data, can be transmitted over a VPN and can be provided to the appropriate application for processing.

If the VPN connection is determined to be carrying remote control data content or other content from a VDI server 104, the data 308 stream is provided to a second VPN client instance 226b (step 520). The data 308 stream is then provided to the receiver application 124 (step 524). Accordingly, data, in this case in the form of remote control data, can be transmitted over a second VPN to the VDI client device 108 and can be routed to the appropriate facility on the client device 108. The VPN client instance 226b can be an instance of the same VPN client application 226 that provides the first VPN client instance 226a. Alternatively, each VPN client instance 226a and 226b can be associated with a different VPN client application 226. In addition, it should be appreciated that the provision of different streams 304, 308 to different applications can be performed simultaneously. That is, communications using multiple different VPN connections can be conducted simultaneously by the VDI client device 108 in accordance with embodiments of the present disclosure.

After providing to the media 304 or data 308 stream to the appropriate receiving application, or after a determination at step 504 that a media 304 or data 308 stream has not been received, a determination can be made as to whether the VDI client device 108 has information to send to another entity, such as a server 104 or another device 108 (step 528). If a determination is made that the VDI client device 108 has information to send, a determination is next made as to whether the information comprises media content or remote control data content (step 532). The determination as to whether the information comprises media content or data content can be made by the VDI DMC application 132.

If the information is determined to comprise media, the media 304 stream is provided by the VDI DMC application 132 to the VDI communication application 128 (step 536). For example, voice and/or video data received at a user input 212 can be provided to the VDI DMC application 132 and then delivered to the VDI communication application 128. The media stream is then provided to the first instance of the VPN client 226a for delivery to a receiving node 104 or 108 via a VPN connection over the network 116 (step 540). In accordance with embodiments of the present disclosure, the first instance of the VPN client 226a can be associated with the VDI communication application 128, such that all media handled by the VDI communication application 128 is passed through the first instance of the VPN client 226a. For example, the first instance of the VPN client 226a can be dedicated to the VDI communication application 128.

If the information is determined to comprise remote control data, the datastream 308 is provided by the VDI DMC application 132 to the receiver application 124 (step 544). For example, operations initiated by or in association with input received at a user input 212 and/or through the operation of an application, applet, or other programming on the VDI client device 108 can produce data that is provided to the VDI DMC application 132, which is then delivered to the receiver application 124. The data 308 is then provided to the second instance of the VPN client 226b for delivery to the network 116 via the communication interface 228 within a second VPN (step 548). In accordance with embodiments of the present disclosure, the second instance of the VPN client 226b can be associated with the receiver application 124, such that all data handled by the receiver application 124 is passed through the second instance of the VPN client 226b. For example, the second instance of the VPN client 226b can be dedicated to the receiver application 124.

After providing a media 304 or data 308 stream to a VPN client instance 226, or after determining that there is no information needing to be sent, a determination can be made as to whether the process should be continued (step 432). Although depicted in series, various of the steps of the method can be performed in a different order. In addition, multiple steams 304 and/or 308 can be sent or received by a VPN client device 108 via different VPN connections simultaneously. If the process is to be continued, he can return to step 504. Alternatively, the process can end.

Realizations include embedding a virtual machine in the VDI client device 108, or coupling a router function to manage traffic from the applications. This latter approach is the recommended path, which would be administered at implementation to forward traffic to the specific subnetwork. Since this VDI Device is a standalone system, this approach is viable from a customer perspective as well. This operates differently than the default VPN services embedded in an operating system requiring the solution to essentially nail up a connection with address port mapping. If not, on re-establishment the core OS services may not appropriately connect the services.

Embodiments of the present disclosure also support teletype (TTY) communications. For example, a TTY device, which enables one or multiple parties to a communication session to communicate using text over what is nominally a voice telephony communication link, can be implemented by a VDI client device 108 as described herein. Moreover, TTY communications supported by a VDI client device 108 can be associated with multiple communication paths. During TTY communications, the operation of TTY software, for example provided as an integrated part of or in association with a VDI communication application 128, is synchronized with other providers of video or visually displayed output, to ensure that the TTY communications are visible to the user.

In accordance with further embodiments of the present disclosure, portions of a single real-time TTY communication can be transported using different communication paths. These different communication paths may be associated with the different VPN connections. More particularly, an audible (i.e. speech) portion of a TTY communication may be associated with a media stream 304 received from another client 108 or endpoints, while a text portion of the TTY communication may be associated with a data stream 308 received from a VDI server 104. For example, the VDI server 104 can perform in decoding functions with respect to the text portion of the TTY communication, which is then sent to the VDI client device 108 as a data 308 stream. In this situation, separate handling of the media 304 and data 308 streams at the VDI client device 108 is required. More particularly, the audible or media portion of the TTY communication is passed to a VDI communication application 128, while the data portion of the TTY communication is passed to the receiver application 124. The VDI DMC application 132 then provides the media 304 and data 308 streams to an appropriate user interface device. For example, a media stream 304 comprising a voice signal can be provided to a user output 216 comprising a speaker, while a data stream 308 comprising a text portion of the communication can be provided to a user output 216 comprising a display. In accordance with further embodiments of the present disclosure, one or both of the media 304 and data 308 streams can be associated with a VPN connection. Whether or not the media 304 and data 308 streams are associated with a VPN connection, the routing of the different streams 304, 308 between appropriate user interface devices 212 and 216, and the appropriate application or facility, e.g. the receiver application 124 or the VDI communication application 128, can be performed by the VDI DMC application 132. In addition, as can be appreciated by one of skill in the art after consideration of the present disclosure, text input provided through a user input 212 at the VDI client device 108 can be delivered to the receiving communication device or server as part of the RTP (i.e. the media) stream 304. Accordingly, a VDI client device 108 can be included in a communication session with another communication endpoint 112 in which two streams 304 and 308 are providing information to be output by the VDI client device 108, and in which one stream 304 is associated with information input at the VDI client device 108 and is delivered to the other communication endpoint 112.

In accordance with still other embodiments, a VDI client device 108 supporting a TTY function can perform the decoding of the text portion of the communication. In this scenario, the communication can still involve two separate communication paths which may or may not be associated with a VPN connection. In this further embodiment, the VDI DMC application 132 can operate to provide the different media streams to appropriate output devices 216.

Integration of a VDI client device 108 or brick into a personal trust circle for the user and their sessions allows a user to direct media streams to various devices or facilities, including the VDI communication application 132. This includes the ability for a coordinated hand-off among devices complementing EC500 services.

Previous systems present scenarios where a user is able to manage communications among a suite of devices. In such a case, a user's office may contain several communications tools such as a deskphone, a PC, a cellphone, a speakerphone, a headset, a tablet device, a smartphone, and a TV. The user manages communications among these devices depending on the context of the session where, for example, a call with the boss may be live on a speakerphone when an incoming call from a friend is offered. The user may decide (or the system decides based on context) to route the incoming communication request to an IM session while the other call is in progress.

Embodiments of the present disclosure extend the Personal Workspace concept to allow for VDI client devices 108. This includes providing a signaling connector from a personal workspace manager to the controlling PC in order to manage media delivery. The reason is that the context engine implemented as part of the VDI DMC application 132 would need to be aware that in order to deliver voice to the user on the correct physical device, it needs to network with a virtualized PC in the data center instead of routing content to the desktop directly. As with other parts of the VDI solution, this presents many complexities. For example, the context engine needs to route the media via a direct path to the VDI communication application 128 rather than attempt to route it to the VDI Virtual PC 220. And physical controls (e.g., volume) that are managed by the context engine will require a direct signaling connect to the VDI communication application 128. (Volume Control is part of the Personal Workspace solution so that it can, for instance, allow an incoming session to be a "whisper" volume if the user desires).

The VDI communication application 128 can manage video calls. The user hopes to see the video on their monitor just as they would see it on a dedicated PC. The challenge is that the monitor in the normal VDI mode shows their PC Desktop for the Virtual PC 220. Any media sent to the VDI connection would be shown on the screen as would the virtual PC desktop and applications. However, the video media for the VDI communication application 128 is delivered directly—not via the VDI connection 308. Therefore the VDI receiver 124 is not aware of the video call nor the need to overlay/insert the video call content onto the monitor.

The solution requires the VDI communication application 128 to work with the VDI receiver 124 software within the VDI client device 108 to negotiate how to present video on the monitor. VDI communication application 128 can, via an API, insert or overlay the video on the monitor as directed by the UC Application. Control is passed from the UC Application directly to the VDI communication application 128, and then the VDI communication application 128 leverages the receiver's 124 API to negotiate placement of the video window. The receiver 124 will overlay a video window on top of the user's normal VDI application. Control of the video application such as selecting to 'mute video' or resizing are passed back to the VDI communication application 128 transparently via the API and the video content is negotiated back up to the host communications system prior to the content adjustment on the user's screen. When the user decides to enlarge the video, for example, the VDI Communicator negotiates for a larger bandwidth source. Or, for example, to mute the video, the VDI communication application 128 would negotiate halting the stream from the source. Control of video can also be through the VDI DMC application 132.

The VDI communication application 128 along with a VDI receiver 124 can be embedded in any device. For example, a headset could contain the software eliminating the need for a separate desktop 'brick'.

With the explosion of 'Bring your own Device' within enterprise environments, the need for lower cost infrastructure, and the ever reducing size of microcomputers, an opportunity exists to get out in front of these trends and provide a VDI solution that takes advantage of all three. Today, companies are interested in VDI solutions as a way to reduce IT costs per employee. For employees that bring their own device, or already have a computer, they really only need a telephone. Today, this is accomplished by providing the employee with a headless softphone (VDI-C), running on a Desktop Thin client (e.g., HP), a headset, keyboard, mouse and monitor.

A VDI headless softphone can, in accordance with embodiments of the present disclosure, be delivered within an existing device already present. For example, an employee may have an iPad and their headset could contain the VDI-C software eliminating the need for a separate desktop thin client, keyboard, monitor and mouse. Or, a scaled down, custom device could be provided that could serve as a paper weight but has a USB port for a headset. This idea is similar to the Roku media streaming solution used to stream internet movies and tv shows to a television. In this case, the media is audio (or video) P2P or Conferencing data.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
   establishing, by a microprocessor, virtual private network (VPN) client instances at a virtual desktop infrastructure (VDI) client device;
   receiving, by the microprocessor and via a VPN client instance, a first stream at the VDI client device;
   receiving, by the microprocessor and via a VPN client instance, a second stream at the VDI client device;
   determining, by the microprocessor, whether the first and second streams comprise a media stream or a data stream by determining, respectively, whether the received first and second streams carry media content or remote control data,
   wherein when the microprocessor determines that the received first stream is the media stream then the microprocessor provides the media stream to a first VPN client instance,
   wherein when the microprocessor determines that the received second stream is the data stream then the microprocessor provides the data stream to a second VPN client instance, and
   executing, by the microprocessor, the first VPN client instance simultaneously with the second VPN client instance;
   wherein the media stream is received simultaneously at the VDI client device with the data stream, and wherein the media stream and the data stream each require simultaneous use of a common communication node of the VDI client device.

2. The method of claim 1, wherein the media stream is a real time protocol (RTP) media stream and the data stream is necessary to establish the second VPN client instance between the VDI client device and a VDI server.

3. The method of claim 1, wherein the media stream and the data stream arrive simultaneously at the VDI client device over a single VPN connection and contention issues occur for the common communication node, and wherein the contention issues are resolved by the microprocessor executing the first VPN client instance simultaneously with the second VPN client instance.

4. The method of claim 1, further comprising controlling, by the microprocessor, the media stream using processing rules that control the simultaneous use of the common communication node of the VDI client device.

5. The method of claim 1, wherein the first VPN client instance connects the VDI client device and a communications center server, and wherein the second VPN client instance connects the VDI client device and a VDI server.

6. The method of claim 5, wherein the communications center server comprises a private branch exchange (PBX) server.

7. The method of claim 6, wherein the first VPN client instance uses a first VPN connection and the microprocessor receives the media stream through the first VPN connection, wherein the second VPN client instance uses a second VPN connection, and wherein the microprocessor receives the data stream through the second VPN connection and the data stream is necessary to control the second VPN connection.

8. The method of claim 5, wherein the microprocessor implements the first VPN client instance by a first VPN client application running on the VDI client device, wherein the microprocessor implements the second VPN client instance by a second VPN client application running on the VDI client device, and wherein the media stream is a video call.

9. The method of claim 8, further comprising managing, by the microprocessor, the first and second VPN client instances using a local VPN manager running on the VDI client device to control use of the common communication node at the VDI client device.

10. The method of claim 1, further comprising granting, by the microprocessor, a user log in on multiple services at the VDI client device in response to receiving authorization information in a single sign-on procedure.

11. The method of claim 1, further comprising:
    providing, by the microprocessor, a VDI desktop media controller that comprises a routing function that directs the media stream and the data stream.

12. The method of claim 1, further comprising:
    operating, by the microprocessor, a VDI communication application that controls the media stream and the data stream, wherein the VDI communication application comprises a teletype function.

13. The method of claim 12, wherein the media stream includes audible data output by the microprocessor at the VDI client device, and wherein the data stream includes text data output by the microprocessor at the VDI client device, the audible data being output simultaneously with the text data at the VDI client device.

14. The method of claim 13, further comprising:
    sending, by the microprocessor, an additional media stream from the VDI client device, wherein the additional media stream comprises audible information that encodes textual information.

15. The method of claim 14, wherein the VDI client device is part of a headset that outputs the audible information from the additional media stream.

16. A system, comprising:
    a microprocessor, and
    a non-transient computer readable medium coupled thereto, the microprocessor receiving and executing instructions from the non-transient computer readable medium and wherein the instructions cause the microprocessor to:
    establish virtual private network (VPN) client instances at a virtual desktop infrastructure (VDI) client device;
    receive, via a VPN client instance, a first stream at the VDI client device;
    receive, via a VPN client instance, a second stream at the VDI client device;
    determine whether the first and second streams comprise a media stream or a data stream by determining, respectively, whether the received first and second streams carry media content or remote control data,
    wherein when the microprocessor determines that the received first stream is the media stream then the microprocessor provides the media stream to a first VPN client instance, wherein when the microprocessor determines that the received second stream is the data stream then the microprocessor provides the data stream to a second VPN client instance, and execute the first VPN client instance simultaneously with the second VPN client instance;

wherein the media stream is received simultaneously at the VDI client device with the data stream, and wherein the media stream and the data stream each require simultaneous use of a common communication node of the VDI client device.

17. The system of claim 16, wherein the media stream is a real time protocol (RTP) media stream and the data stream is necessary to establish the second VPN client instance between the VDI client device and a VDI server.

18. The system of claim 16, wherein the first VPN client instance connects the VDI client device and a communications center server, and wherein the second VPN client instance connects the VDI client device and a VDI server.

19. The system of claim 16, wherein the communications center server comprises a private branch exchange (PBX) server.

* * * * *